(12) United States Patent
Shintani (10) Patent No.: US 7,612,674 B2
(45) Date of Patent: Nov. 3, 2009

(54) RADIO FREQUENCY IDENTIFICATION SYSTEM

(75) Inventor: Peter Shintani, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 362 days.

(21) Appl. No.: 11/588,504

(22) Filed: Oct. 27, 2006

(65) Prior Publication Data

US 2008/0100446 A1    May 1, 2008

(51) Int. Cl.
G08B 13/14    (2006.01)
(52) U.S. Cl. .................... 340/572.2; 340/572.4
(58) Field of Classification Search ........... 340/10.6, 340/10.3, 10.4, 572.1, 572.4, 825.69, 825.71
See application file for complete search history.

(56) References Cited

U.S. PATENT DOCUMENTS

| | | | |
|---|---|---|---|
| 6,480,110 B2 * | 11/2002 | Lee et al. ............. | 340/572.5 |
| 6,617,962 B1 * | 9/2003 | Horwitz et al. ........ | 340/10.4 |
| 6,738,712 B1 | 5/2004 | Hildebrant | |
| 6,747,561 B1 | 6/2004 | Reeves | |
| 6,784,789 B2 * | 8/2004 | Eroglu et al. ......... | 340/10.6 |
| 2005/0052283 A1 | 3/2005 | Collins et al. | |
| 2006/0114109 A1 | 6/2006 | Geissler | |
| 2006/0188116 A1 | 8/2006 | Frerking et al. | |
| 2006/0220785 A1 | 10/2006 | Ferdman | |
| 2006/0235488 A1 | 10/2006 | Nycz et al. | |

FOREIGN PATENT DOCUMENTS

| WO | WO/0011592 A2 | 3/2000 |
|---|---|---|
| WO | WO/0167413 A1 | 9/2001 |

\* cited by examiner

*Primary Examiner*—Anh V La
(74) *Attorney, Agent, or Firm*—Crowell & Moring LLP (57) ABSTRACT

A reader emits a low frequency signal to energize a RFID tag. The RFID tag responds with a high frequency signal. An antenna on the RFID tag functions as a resonant circuit upon receiving the low frequency signal to power up the RFID tag. In one embodiment, the high frequency signal is a millimeter frequency signal.

29 Claims, 5 Drawing Sheets

RADIO FREQUENCY IDENTIFICATION SYSTEM

FIELD OF THE INVENTION

The present invention relates generally to the field of telecommunication systems, and in particular to implementing radio frequency identification technology using high frequencies.

BACKGROUND OF THE INVENTION

Radio Frequency Identification (RFID) systems are used in a variety of ways in product tracking, supply chain management, and numerous logistical operations. Applications of RFID tags include replacement of bar codes in inventory management of consumer items, tracking of books in libraries or bookstores, shipping container and truck/trailer tracking, and livestock tracking. In the automotive field, RFIDs are used in car keys to activate vehicles and for tire tracking. Transport payments are enabled by the use of RFID smartcards.

A typical RFID system consists of the inclusion of one or more small inexpensive tags that contains transponders with a digital memory chip that is given a unique product code. In the case of passive tags, a base station (or reader) emits a signal activating the RFID tag to cause it to emits a signal. The reader can then receive this signal and decode the data encoded therein. As is know in the RFID art, RFID readers transmits RF power to RFID tags. RFID tags are interrogated by, and respond to, RFID readers utilizing a radio-frequency forward link and a backscatter return link. Some RFID tags contain a demodulator which is used to recover a timing (or clock) signal from the signal received from the RFID reader. The recovered clock signal is then utilized to generate a value to control a digitally-controlled oscillator that provides clock signal used in the backscatter return link.

RFID systems have been allocated bands of operation at particular frequencies. Low-frequency (125 kHz) RFID tags can be used globally without a license. Additional, 900 MHz tags are typically used in warehousing and shipping, while the lower frequencies (125 kHz, 13.56 MHz) are generally used for inventory or shelving operations.

Low-frequency and higher-frequency RFID systems each have their advantages and disadvantages. For example, it is generally easier and cheaper to generate RF power at lower frequencies. Since many applications require a low-cost RFID tag system, low frequencies are commonly used. However, low frequency systems require physically larger antennas and can result in signal propagation to unwanted areas. Signal processing to correct these phenomena is possible but would make the tags too expensive. The low carrier frequency also puts a ceiling on the allowable data rate. Without the use of more intensive and expensive signal processing techniques it is difficult to approach a data transmission bit rate of 1 kbps per kHz, so a 125 kHz system would top off at around 100 kbps data rate transfer, which though in some applications would be more than adequate, in others would be a limitation.

There is a band of very high frequencies in the 57-64 GHz range ("60 GHz band") that is located in the millimeter-wave portion of the electromagnetic spectrum and has been largely unexploited for commercial wireless applications. This spectrum is unlicensed by the FCC in the United States and by other bodies world-wide. In addition to the higher-data rates that can be accomplished in this spectrum, energy propagation in the 60 GHz band has unique characteristics that make possible many other benefits such as excellent immunity to interference, high security, and frequency re-use. However, RFID tags designed for receiving millimeter frequency signals are more expensive than tags designed for receiving low frequency signals. As such, what is needed is an RFID system that can take advantage of the benefits of both low and high frequency signals.

SUMMARY OF THE INVENTION

Disclosed and claimed herein is a RFID system that includes a radio frequency (RF) reader for transmitting a first RF signal having a first frequency, and an RFID tag configured to receive the first RF signal. The RFID tag is further configured to transmit a second RF signal having a second frequency in response to the first RF signal. In one embodiment, second frequency is between 30 GHz and 300 GHz and the first frequency is less than 30 GHz.

Other aspects, features, and techniques of the invention will be apparent to one skilled in the relevant art in view of the following description of the exemplary embodiments of the invention.

DETAILED DESCRIPTION OF THE EXEMPLARY EMBODIMENTS

One aspect of the invention is a dual-frequency RFID system. In certain embodiments, it may be preferable to use different radio frequencies in an RFID system. In accordance, a lower frequency may be used to energize an RFID tag, while a higher frequency (e.g., millimeter frequency) may be used to make a range-restricted radio frequency communication. It should be appreciated that references herein to "higher frequencies" refers to frequencies in the millimeter band, which includes all frequencies between 30 GHz to 300 GHz ("millimeter band""). Frequencies in the millimeter band are also known as extremely-high frequencies (EFH). In contrast, references herein to "lower frequencies" includes all frequencies below the millimeter band, and in particular include frequencies centered about the 125 kHz, 900 MHz, 1.8 GHz and 2.4 GHz frequencies.

Another aspect of the invention is to leverage the near line-of-sight propagation characteristics of millimeter frequency transmissions, while minimizing the power requirements of the RFID tag. Millimeter frequency signals enjoy an inherent security advantage as compared to longer wavelengths that bend around corners or propagate through barriers to potentially unintended territories. The design of the antenna on the tag can make the transmission from the tag highly directive or even alternatively omni-directional. An RFID reader can therefore transmit and receive selectively from a particular asset.

In one embodiment, a millimeter frequency (e.g., 60 GHz) RFID tag may be activated with a lower frequency (e.g., 900 MHz) signal. In such an embodiment, the RFID tag's antenna may act as a resonant circuit, providing both inductive and capacitive properties, to power up its internal circuits from the received energy. Once powered up using the lower frequency, the millimeter frequency tag may then transmit a responsive signal at the higher frequency (e.g., 60 GHz band). This arrangement would yield much more location-specific information about asset location than conventional RFID systems.

In another embodiment, an RFID system of the invention would enable an RFID reader to receive information for a particular tagged asset. Heretofore, activating an RFID reader would have cause every RFID tag within the reader's coverage area to respond. Thus, it would not be possible to identify a tagged asset, and receive the data stored on that particular RFID tag. However, the current invention permits a user to identify a particular tagged asset, and to receive only the information from that RFID tag. By way of example, a user could point an RFID reader at a tagged asset of interested. Activating the RFID reader would propagate the low frequency transmission throughout the reader's coverage area. However, given the directionality of the return signal (e.g., 60 GHz), only the RF signal from the desired RFID tag will be detected by the RFID reader. As such, a user can identify an asset of interest, and receive asset-specific information in response to a low frequency polling signal.

Still another aspect of the invention is to a 60 GHz RFID system for implementing Digital Rights Management (DRM) of audio/video content. DRM is the digital management of user rights to content which links specific user rights to media in order to provide persistent control of user activities such as viewing, duplication and/or access. To that end, in one embodiment an RFID tag which transmits in the 60 GHz band can be used to verify the locality of a multimedia device to which a user has requested that DRM-protected content be transferred. DRM compliance can be attained by having the content source (e.g., personal computer, set-top box, etc.) poll an RFID tag embedded in the multimedia device. Given the propagation properties of 60 GHz band signals (or any millimeter band signal), a response from the multimedia device would verify that it is in fact a local device. Similarly, periodic polling could be used to verify that the multimedia device to which the content was copied remains local.

Given the directionality of millimeter frequency signals, it may be necessary to place multiple RFID tags on a single asset. In some embodiments, the plurality of RFID tags may have the same identity number and be placed on different surfaces of the tagged asset. However, doing so may cause interference between the individual RFID tag signals. As such, another embodiment is to the RFID tags may be configured to transmit delayed signals back to the reader. In this fashion, a reader would be able to poll multiple RFID tags on a single asset while minimizing interference.

Another aspect of the invention is to integrate an RFID system with 60 GHz wireless networks. In one embodiment, a 60 GHz network may poll appliances attached to it at periodic intervals to assess the presence of new networked clients, and any changes in status of existing networked appliances. There is also significant commercial application in using a 60 GHz transceiver and a synchronous clocking system to authenticate new network appliances and to establish connectivity. New network protocols based on operation at 60 GHz are emerging. This will make it possible to provide truly massive bandwidths, within local areas, at rates of several to tens of gigabits per second, so that massive information sources may be transmitted wirelessly within seconds or milliseconds. The capabilities of massively broadband wireless devices, communicating at carrier frequencies of 60 GHz will reduce the need for multiple and hierarchical storage systems and reduce today's bulky, cumbersome storage devices such as hard drives, large paper texts, CDs and other storage devices in a complex database system.

In one embodiment, a transmitter antenna in an RFID tag can be much smaller than previously-attainable sizes given the millimeter band frequency of the signal to be transmitted. In particular, wavelengths at 60 GHz is 0.5 mm and antenna dimensions are usually on the order of half a wavelength or less. Because of this, it may be possible to incorporate the antenna and/or entire RFID tag inside a semiconductor device or package. It should be appreciated that a diversity of antennae configurations and polarizations are possible, ranging from omni-directional to narrow beam, and from linear to circular polarizations.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Figure 1:
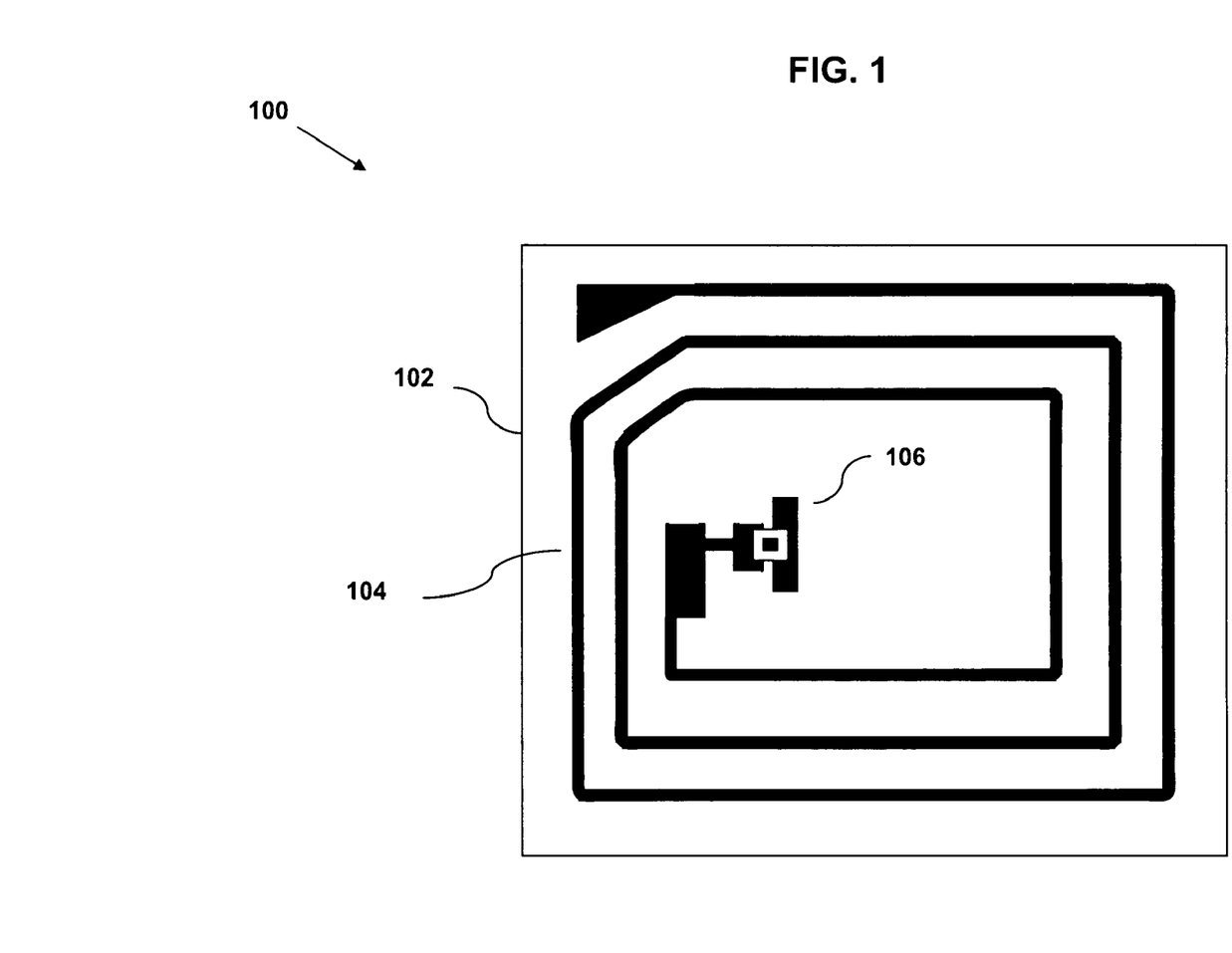
FIG. 1 illustrates an RFID tag in accordance with one embodiment of the invention.

Referring now to the figures, FIG. 1 depicts an RFID tag 100 in accordance with one embodiment of the invention. As previously discussed, the tag 100 may be placed on one or more surfaces of an asset that is to be located and/or otherwise identified. This embodiment system comprises a mechanically protective structure 102 which protects an antenna 104 from mechanically harmful bending stresses. The antenna 104 may be made of a metallic material with good electrical conductivity properties. The antenna 104 may be further configured to transmit a signal having a frequency in the millimeter band (e.g., 30 GHz to 300 GHz), which in one embodiment is in the 60 GHz band. In one embodiment, the antenna is also configured to function as a resonant circuit in response to a lower frequency polling signal (e.g., 125 kHz, 900 MHz, 1.8 GHz, 2.4 GHz, etc.), and to generate an induced electrical current to power the processor circuit system 106 in response. In one embodiment, the processor circuit 106 includes a circuit to detect the incoming polling signal, a simple control processor and a memory to store data values. The processor circuit 106 may be programmed to respond to polling from a reader by transmitting data at a millimeter wave frequency utilizing the antenna 104. Thus, one aspect of the RFID tag 100 is to be activated or powered by an RF signal that is lower than the signal at which it transmits.

In this embodiment, the antenna 104 is mounted independently of the processor circuit 106, while in other embodiments the antenna 104 may be attached as an integral part of a semiconductor package or even be an integral part of a circuit etched on a semiconductor substrate. It should be appreciated that antenna 104 may also be a printed loop or wireloop antenna. Moreover, the resonant properties described above for the antenna 104 may similarly be imparted using a separate resonant circuit comprised of an inductor and a capacitor (not shown).

It should further be appreciated that RFID tag 100 may include a low power 60 GHz oscillator for up-conversion. In addition, it may be desirable to provide a degree of antenna beam control due to the high propagation loss and the low power requirement of the tag 100. In one embodiment, beam control may be provided with a retro-directive antenna, while in another embodiment beam control may be provided by changing the transmission frequency.

Figure 2A:
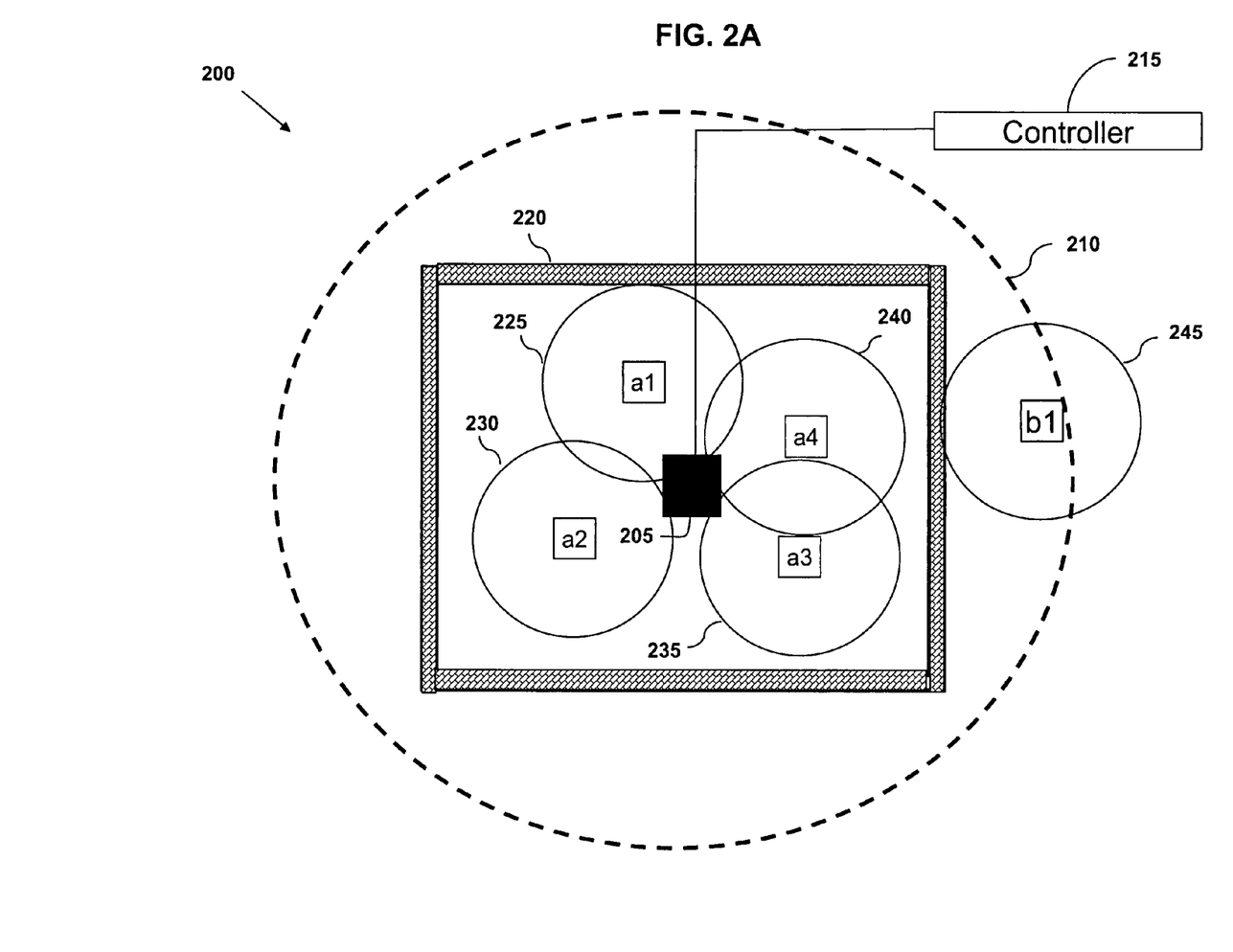
FIGS. 2A-2B illustrate RFID systems in accordance with certain embodiments of the invention.

FIG. 2A illustrates a system 200 for implementing one embodiment of the invention. As shown, system 200 comprising a reader 205 which radiates RF energy at a lower frequency (e.g., 125 kHz, 900 MHz, 1.8 GHz, 2.4 GHz, etc.) over a coverage area 210. The reader 205 is controlled by a system controller 215. While the system controller 215 is depicted as being remote from the reader, in other embodiments the controller 215 may be integrated with the reader 205. Moreover, while the power radiated from the reader 205 is shown as being omnidirectional, numerous other radiation shapes and directionality may be used.

The reader 205 is depicted as being located within an enclosed area 220, which in one embodiment may be a room or some other confined region. In certain embodiments, the low frequency transmissions of the reader 205 are able to penetrate the confined area 220, while higher frequency transmissions (e.g., millimeter frequencies) are not.

RFID tags a1-a4 are also shown within the confined area 220, which may be attached to corresponding assets. RFID tags a1-a4 have RF radiation patterns 225, 230, 235 and 240. In one embodiment, RFID tags a1-a4 emit a higher frequency signal in the millimeter band (e.g., 60 GHz band), having RF radiation patterns 225, 230, 235 and 240. In one embodiment, RFID tags a1-a4 are designed similar to RFID tag 100 of FIG. 1. In addition, a separate RFID tag b1 is depicted as being located outside the enclosed area 220, but still within the coverage area 210 of the reader 205, and as having an RF radiation pattern 245. While the radiation patterns shown are omnidirectional, they may similarly have numerous other shapes and directionalities. For example, in some embodiments radiation patterns 225, 230, 235 and 240 may be highly directional.

Given that RFID tags a1-a4 and b1 are all within the coverage area 210, they will be able to receive the low frequency signal emitted by the reader 205 to power up their electronic circuits. However, only responses from those RFID tags (i.e., a1-a4) within the enclosed area 220 will be received by the reader 205 due to the very high frequency of those signals and their inability to penetrate the enclosed area 220. Accordingly, system 200 can not only verify the presence of particular assets, but also can determine location-specific information for such assets (e.g., asset is within a particular room).

Moreover, the fact that the millimeter-frequency responses from the RFID tags a1-a4 are unable to penetrate the enclosed area 220, the security of the information relayed to by those tags is correspondingly increased. This enables RFID tags to safely transmit sensitive asset-specific information.

As previously mentioned, multiple tags may be used on an asset when the signal to be emitted is directional. However, in order to prevent the possibility of a data collision, such tags may be programmed to respond with different delays. As such, when the asset is polled, regardless of the orientation of the item, at least one tag should be able to respond, and if more than one tag responds, the reader will still be able to accurately receive such responses. While in one embodiment, the delay period is predetermined, in another embodiment the response delay is a random value. Alternatively, the delay period could be a function of the tag's location on a given asset.

Still referring to FIG. 2A, in one embodiment system 200 may be used to implement a Digital Rights Management (DRM) system for protected multimedia content. For example, reader 205 may be contained within a multimedia source (e.g., personal computer, set-top box, etc.), while RFID tags a1-a4 and b1 are contained within various multimedia devices requesting that protected content from the source. DRM compliance is attainable since, prior to transferred the requested content, the multimedia content source will poll for the multimedia device. Given the propagation properties of 60 GHz band signal, a response signal will only be received from those requesting devices that are local to the content source. In the embodiment of FIG. 2A, this means that the content would be transferred to local devices tagged with RFID tags a1-a4, but not to the device tagged with RFID tag b1.

Figure 2B:
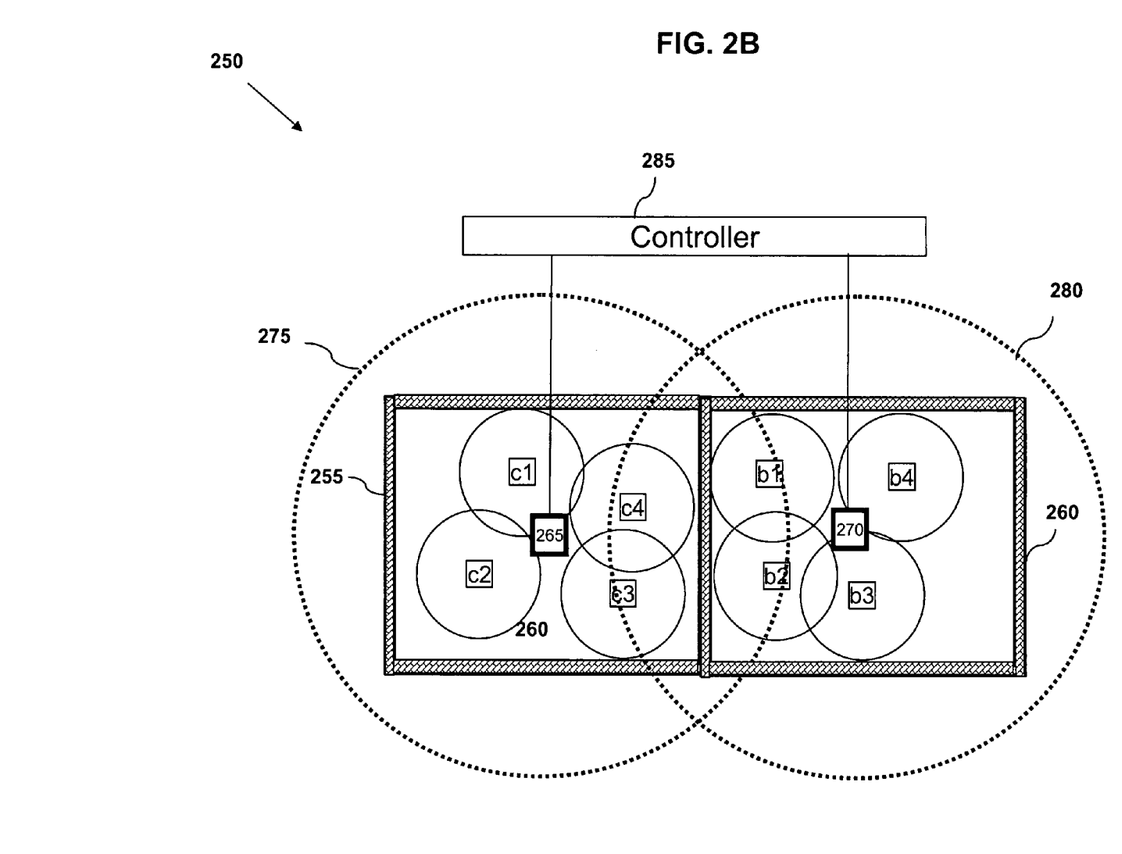

Now referring to FIG. 2B, depicted is an RFID system 250 in accordance with another embodiment of the invention. In this embodiment, two adjacent rooms 255 and 260 are shown, each containing a reader 265 and 270 having propagation patterns 275 and 280, respectively. In one embodiment, the readers 265 and 270 are connected to a system controller 285. Room 255 contains reader 265, as well as RFID tags c1-c4. Room 260 contains reader 270, as well as RFID tags b1-b4. In certain embodiments, RF readers 265 and 270 emit a signal having a relatively low frequency (e.g., below millimeter band), while the RFID tags b1-b4 and c1-c4. email response signals having frequencies in the millimeter wave range (e.g., 60 GHz band). In one embodiment, RFID tags b1-b4 and c1-c4 are designed similar to RFID tag 100 of FIG. 1.

System 250 may used to identify in which room 255 and 260 a particular asset is located, since a given reader will only receive a response signals from those tags within the same room. Even though the RF signal of readers 265 and 270 propagate across physical barriers, only the response signals from local RF tags will be detected. In this manner, more detailed location information may be obtained due to the limited propagation characteristics of the response tag signals. In addition, the limited propagation patterns for the response tag signals imparts the previously-described security benefits of system 250, without unnecessarily increasing the costs of the RFID tags b1-b4 and c1-c4. since they are activated using the low frequency signals of readers 265 and 270.

Figure 3:
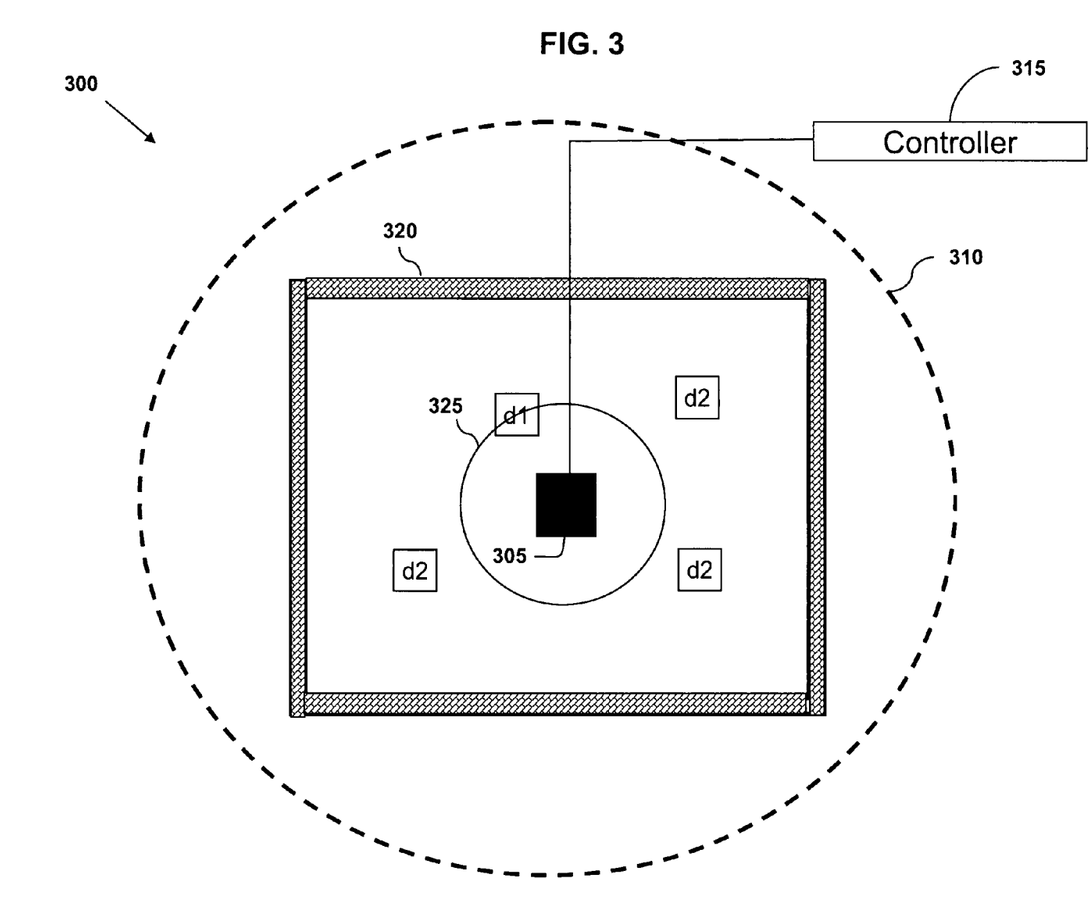
FIG. 3 illustrates an RFID system in accordance with another embodiment of the invention.

FIG. 3 illustrates a system 300 for implementing another embodiment of the invention. In this embodiment, system 300 comprising a reader 305 which radiates a first RF signal at a relatively low frequency (e.g., below millimeter band) over a coverage area 310, and a second RF signal at a millimeter band frequency with radiation pattern 325. The reader 305 may be controlled by a system controller 315, which may be local to or remote from the reader 305. Moreover, while the power radiated from the reader 305 is shown as being omnidirectional, numerous other radiation shapes and directionality may be used.

The reader 305 is depicted as being located within an enclosed area 320, which in one embodiment may be a room or some other confined region. In certain embodiments, the low frequency transmissions of the reader 305 are able to penetrate the confined area 320, while its high frequency transmissions (e.g., millimeter frequencies) are not.

RFID tags d1-d4 are also shown within the confined area 320, which may be attached to corresponding assets. RFID tags d1-d4 emit a low frequency RF signal which (e.g., 125 kHz, 900 MHz, 1.8 GHz, 2.4 GHz, etc.) has a propagation pattern similar to pattern 310.

In one embodiment, the reader 305 may emit a low frequency signal (e.g., below millimeter band) to energize any tags that are in its coverage area 310. Thereafter, the reader 305 may emit a second higher frequency signal (e.g., millimeter band) having pattern 325. In one embodiment, this second signal may be used to cause any tags within the coverage area 325 to respond. Thus, in the embodiment of FIG. 3 only tag d1 will respond to the reader 305 since it is the only tag within the reader's propagation pattern 325. In one embodiment, the response by Tag d1 will be in the form of a low frequency RF signal that is detectable by the reader 305.

In this fashion, system 300 can be used to not only verify the presence of particular assets, but also to determine location-specific information for such assets (e.g., asset is within a particular room). In addition, system 300 permits a user to identify a particular tagged asset, and to receive only the information from that RFID tag. By way of example, a user could point an RFID reader at a tagged asset of interested. Activating the RFID reader would propagate the low frequency transmission throughout the reader's coverage area, thereby energizing all tags in the coverage area. The second signal, which in one embodiment is a millimeter band signal, will be detected (and hence responded to) by only those tags within its limited range. Thus, a user will be able to identify an asset of interest, and receive asset-specific information.

Figure 4:
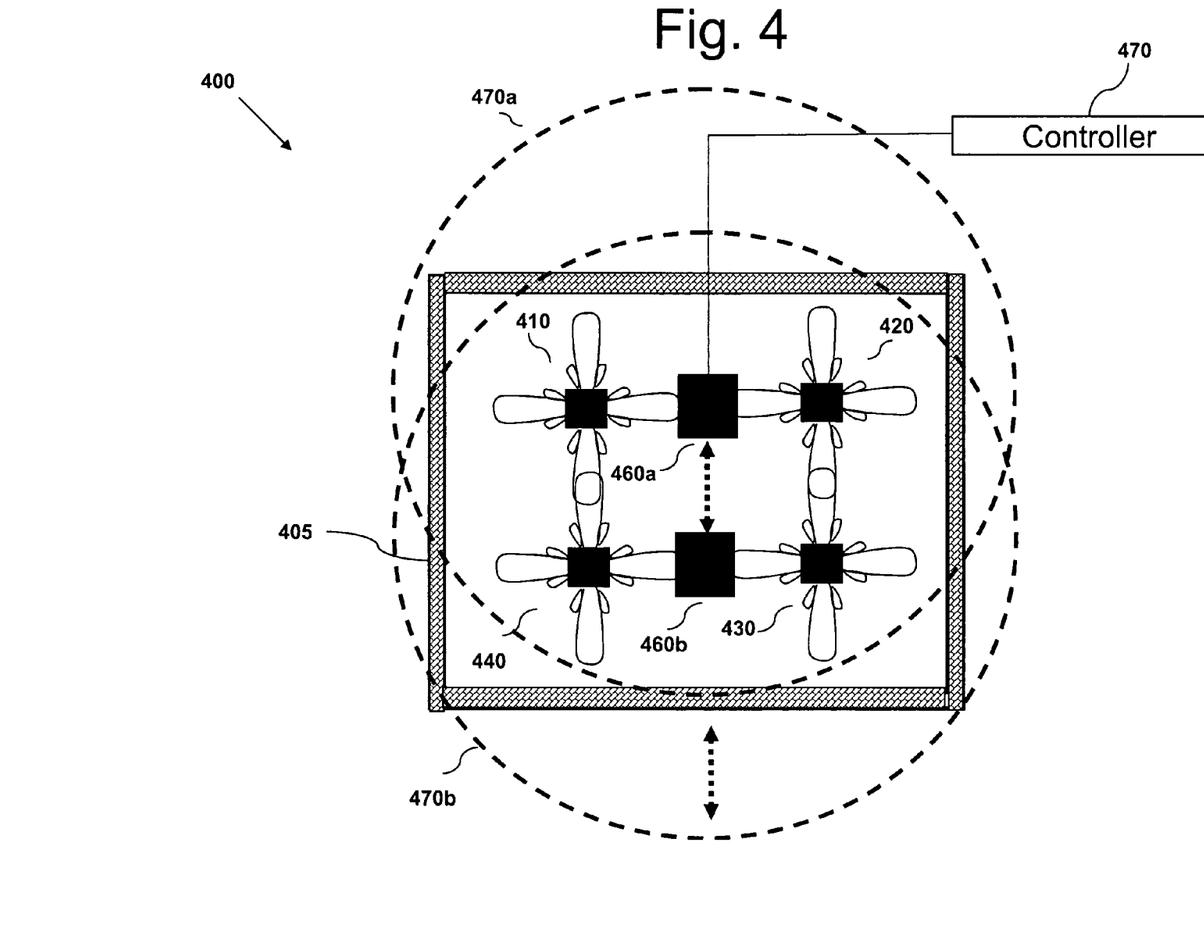
FIG. 4 illustrates an RFID system in accordance with still another embodiment of the invention.

FIG. 4 illustrates an embodiment of an RFID system 400 wherein directional antennae are used, and where each of a four assets 410, 420, 430 and 440 have four individual tags attached to it one on each of its four surface. In this embodiment, the system 400 consisting of an enclosed room 450 which is monitored by a reader that is depicted as being in one of two possible positions 460a and 460b, although obviously the reader may be in any other position within the room 450. Ass shown, the reader is connected to an optional controller 470. However, the controller 470 may alternatively be integrated into the reader 205.

In system 400, assets 410, 420, 430 and 440 each have four RFID tags (e.g., tag 100) affixed to them with highly directional antenna propagation patterns as shown. As the reader moves from location 460a to 460b, its transmission pattern shifts from that of 470a to 470b.

When the reader is in position 460a, it will detect only the presence of assets 410 and 420 given the directionality of the tags' signals, which in one embodiment may be in the 60 GHz band. Similarly, when the reader moves to position 460b, only assets 430 and 440 will be detected. Although not shown, the reader may be moved closer to any one of assets 410-440 to detect only that particular asset. In this fashion, location-specific information about an asset is possible using RFID system 400. Moreover, a user is able to identify an asset of interest, and receive asset-specific information in response to a low frequency polling signal by simply placing a reader in proximity to the tag's directional signal pattern.

Given that multiple response signals from a single asset may interfere with each other, in one embodiment the RFID tags of system 400 may be configured to transmit delayed signals back to the reader. In this fashion, a reader would be able to poll multiple RFID tags on a single asset while minimizing interference.

As previously mentioned, in certain embodiments an RFID tag of the invention (e.g., tag 100) can be operated at a millimeter wave frequency (e.g., 60 GHz), whether or not the reader transmits at this frequency, or at a much lower frequency. That is, the transmitted frequency from the reader may be utilized to energize the circuits on the tag, thereby reducing the cost and complexity of the RFID tag. In addition, the same advantages that accrue for passive RFID tags by virtue of this invention are also applicable to configurations of a RFID system in which active tags are utilized. Active tags carry a power source, such as a battery.

While the preceding description has been directed to particular embodiments, it is understood that those skilled in the art may conceive modifications and/or variations to the specific embodiments described herein. Any such modifications or variations which fall within the purview of this description are intended to be included herein as well. It is understood that the description herein is intended to be illustrative only and is not intended to limit the scope of the invention.

What is claimed is:

1. A radio frequency identification (RFID) system comprising:
    a radio frequency (RF) reader for transmitting a first RF signal having a first frequency; and
    an RFID tag configured to receive the first RF signal and, in response thereto, to transmit a second RF signal having a second frequency, wherein the second frequency is between 30 GHz and 300 GHz and the first frequency is less than 30 GHz.

2. The RFID system of claim 1, wherein the RFID tag comprises:
    a processor circuit; and
    an antenna coupled to the processor circuit, the antenna being configured to function as a resonant circuit in response to the first RF signal in order to power said processor circuit.

3. The RFID system of claim 2, wherein the RFID tag further comprises a memory coupled to the processor circuit, wherein the memory contains data that is transmitted in the transmission signal in response to the first RF signal.

4. The RFID system of claim 1, wherein the first frequency is centered around a band of frequencies, wherein the band is selected from the list consisting of: 125 kHz, 900 MHz, 1.8 GHz, and 2.4 GHz.

5. The RFID system of claim 1, wherein the second frequency is between 57 GHz and 64 GHz.

6. The RFID system of claim 1, wherein the first RF signal is to penetrate a physical barrier that the second RF signal is not able to penetrate.

7. The RFID system of claim 1, wherein the RFID tag is affixed to an asset, the system further comprising a controller in communication with the reader, said controller configured to determined that the asset is within an enclosed area when the reader receives the second RF signal in response to the first RF signal.

8. The RFID system of claim 7, wherein the first RF signal propagates beyond the enclosed area, and the second RF signal is confined within the enclosed area.

9. The RFID system of claim 1, further comprises a plurality of RFID tags each of which is configured like said RFID tag, said plurality of RFID tags being attached to an asset.

10. The RFID system of claim 9, wherein each of the plurality of said RFID tags are configured to transmit delayed signals to the reader in response to the first RF signal.

11. The RFID system of claim 1, further comprising:
    a plurality of RFID tags each of which is configured like said RFID tag, said plurality of RFID tags being located in a plurality of adjacent enclosed areas;
    a plurality of readers each of which is configured like said RF reader, said plurality of readers being located in one or more of the plurality of adjacent enclosed areas; and a controller in communication with the plurality of readers, the controller being configured to determine which of the plurality of RFID tags are in which of the plurality of adjacent enclosed areas.

12. A method comprising:
  transmitting a first radio frequency (RF) signal having a first frequency from a reader;
  receiving the first RF signal by a radio frequency identification (RFID) tag; and
  transmitting, in response to said receiving, a second RF signal having a second frequency by the RFID tag, wherein the second frequency is between 30 GHz and 300 GHz and the first frequency is less than 30 GHz.

13. The method of claim 12, further comprising powering a processor circuit of the RFID tag using the first RF signal.

14. The method of claim 13, further comprising configuring an antenna of the RFID tag to function as a resonant circuit in response to the first RF signal in order to power said processor circuit.

15. The method of claim 12, further comprising:
  affixing the RFID tag to an asset; and
  receiving the second RF signal by the reader when the asset is within an enclosed area.

16. The method of claim 15, wherein the first RF signal propagates beyond the enclosed area, and the second RF signal is confined within the enclosed area.

17. The method of claim 12, further comprising affixing a plurality of RFID tags, each of which is configured like said RFID tag, to an asset.

18. The method of claim 17, further comprising transmitting delayed signals by each of the plurality of said RFID tags in response to the first RF signal.

19. The method of claim 12, wherein the first frequency is centered around a band of frequencies selected from the list consisting of: 125 kHz, 900 MHz, 1.8 GHz, and 2.4 GHz.

20. The method of claim 12, wherein the second frequency is between 57 GHz and 64 GHz.

21. A radio frequency identification (RFID) tag comprising:
  a processor circuit; and
  an antenna coupled to the processor circuit, the antenna being configured to function as a resonant circuit in response to a first radio frequency (RF) signal having a first frequency in order to power said processor circuit, wherein the RFI tag is configured to receive the first RF signal and, in response thereto, to transmit a second RF signal having a second frequency, wherein the second frequency is higher than the first frequency.

22. The RFID tag of claim 21, wherein the second frequency is between 30 GHz and 300 GHz and the first frequency is less than 30 GHz.

23. The RFID tag of claim 22, wherein the first frequency is centered around a band of frequencies selected from the list consisting of: 125 kHz, 900 MHz, 1.8 GHz, and 2.4 GHz.

24. The RFID tag of claim 21, wherein the RFID tag is located in an enclosed area, and wherein the first RF signal is to propagate beyond the enclosed area, while the second RF signal is to be confined within the enclosed area.

25. A system for implementing Digital Rights Management (DRM) comprising:
  a requesting multimedia device having an associated RFID tag and configured to wirelessly transmit a request to receive DRM-protected content; and
  a multimedia content source including a radio frequency identification (RFID) reader, the content source being configured to,
    receive the request from the requesting multimedia device,
    poll the RFID tag of the requesting multimedia device, and
    receive a response signal from the requesting device based on said poll, wherein the response signal has a frequency of between 57 GHz and 64 GHz, and
    transmit the DRM-protected content in response to said response signal.

26. A radio frequency identification (RFID) system comprising:
  a radio frequency (RF) reader for transmitting a first RF signal having a first frequency and a second RF signal having a second frequency that is higher than the first frequency; and
  an RFID tag configured to be energized by the first RF signal and, in response to receiving the second RF signal, the RFID tag being further configured to transmit a third RF signal at a third frequency which is lower than the second frequency.

27. The RFID system of claim 26, wherein the second frequency is between 30 GHz and 300 GHz.

28. The RFID system of claim 27, wherein the first and third frequencies are below 30 GHz.

29. The RFID system of claim 26, wherein the RFID tag comprises:
  a processor circuit; and
  an antenna coupled to the processor circuit, the antenna being configured to function as a resonant circuit in response to the first RF signal in order to power said processor circuit.

* * * * *